United States Patent
Hugues

(10) Patent No.: US 8,960,661 B2
(45) Date of Patent: Feb. 24, 2015

(54) STACKER DEVICE FOR FLAT ARTICLES STACKED ON EDGE, AND A POSTAL SORTING MACHINE

(71) Applicant: SOLYSTIC, Gentilly Cedex (FR)

(72) Inventor: Damien Hugues, Bourg les Valence (FR)

(73) Assignee: SOLYSTIC, Gentilly Cedex (FR)

( * ) Notice: Subject to any disclaimer, the term of this patent is extended or adjusted under 35 U.S.C. 154(b) by 37 days.

(21) Appl. No.: 13/816,986

(22) PCT Filed: Nov. 19, 2012

(86) PCT No.: PCT/FR2012/052668
§ 371 (c)(1),
(2) Date: Feb. 14, 2013

(87) PCT Pub. No.: WO2013/083893
PCT Pub. Date: Jun. 13, 2013

(65) Prior Publication Data
US 2014/0064906 A1    Mar. 6, 2014

(30) Foreign Application Priority Data
Dec. 5, 2011 (FR) ...................................... 11 61144

(51) Int. Cl.
*B65H 1/02* (2006.01)
*B65G 57/00* (2006.01)
(Continued)

(52) U.S. Cl.
CPC ............... *B65G 57/00* (2013.01); *B65H 31/06* (2013.01); *B65H 31/14* (2013.01); *B65H 31/18* (2013.01);
(Continued)

(58) Field of Classification Search
USPC ............ 271/2, 3.04, 3.12, 149, 150; 414/790, 414/790.1; 198/419.1, 419.3, 429
See application file for complete search history.

(56) References Cited

U.S. PATENT DOCUMENTS 4,052,052 A * 10/1977 Muller .......................... 271/157
5,393,196 A    2/1995 Bluemle
(Continued)

FOREIGN PATENT DOCUMENTS

DE    4431346 A1    3/1996
EP    0 659 669 A1    6/1995
(Continued)

OTHER PUBLICATIONS

French Search Report for FR 1161144 dated Aug. 3, 2012.
(Continued)

*Primary Examiner* — Ernesto Suarez
(74) *Attorney, Agent, or Firm* — Sughrue Mion, PLLC

(57) ABSTRACT

A stacker device (1) for flat articles (2) stacked on edge, said device including a retaining paddle (6) mounted to be moveable along the stacking path (E) between an upstream position and a downstream position, and between a working position in which it interferes with said stacking path (E) and a resting position in which it does not interfere with said stacking path (E), a holding finger (7) suitable for being in a deployed position in which it interferes with said stacking path (E) so as to receive the foot of a flat article (2) bearing against it, and mounted to be moveable along said stacking path (E) between a rear position and a front position, said holding finger (7) and said retaining paddle (6) being independent from each other so that said holding finger (7) retains said foot of the flat article (2) even when said retaining paddle (6) is in its resting position.

10 Claims, 3 Drawing Sheets

(51) Int. Cl.
  *B65H 31/06* (2006.01)
  *B65H 31/14* (2006.01)
  *B65H 31/18* (2006.01)
  *B65H 33/02* (2006.01)
  *B65H 3/50* (2006.01)
(52) U.S. Cl.
  CPC .............. *B65H 33/02* (2013.01); *B65H 3/50*
       (2013.01); *B65H 2404/25* (2013.01); *B65H*
       *2601/325* (2013.01); *B65H 2701/1916*
       (2013.01); *B65H 2407/20* (2013.01)
  USPC .......... 271/3.04; 271/3.12; 271/150; 271/149

(56) References Cited

U.S. PATENT DOCUMENTS

| | | | |
|---|---|---|---|
| 5,515,667 A | 5/1996 | Roosli | |
| 5,947,468 A * | 9/1999 | McKee et al. | 271/210 |
| 6,679,491 B2 * | 1/2004 | Luebben et al. | 271/150 |
| 6,749,193 B2 * | 6/2004 | Berdelle-Hilge et al. | 271/149 |
| 6,782,678 B1 * | 8/2004 | Bodereau | 53/542 |
| 7,182,331 B2 * | 2/2007 | Berdelle-Hilge et al. | 271/150 |
| 8,610,021 B2 * | 12/2013 | Campagnolle et al. | 209/584 |
| 2008/0265494 A1 | 10/2008 | Moriwaki et al. | |
| 2010/0050572 A1 | 3/2010 | Roth et al. | |

FOREIGN PATENT DOCUMENTS

| | | |
|---|---|---|
| JP | 53-150300 U | 11/1978 |
| JP | 59-36066 A | 2/1984 |
| JP | 8-2779 | 1/1996 |
| WO | 2011/117509 A1 | 9/2011 |

OTHER PUBLICATIONS

International Search Report for PCT/FR2012/052668 dated May 3, 2013.

* cited by examiner

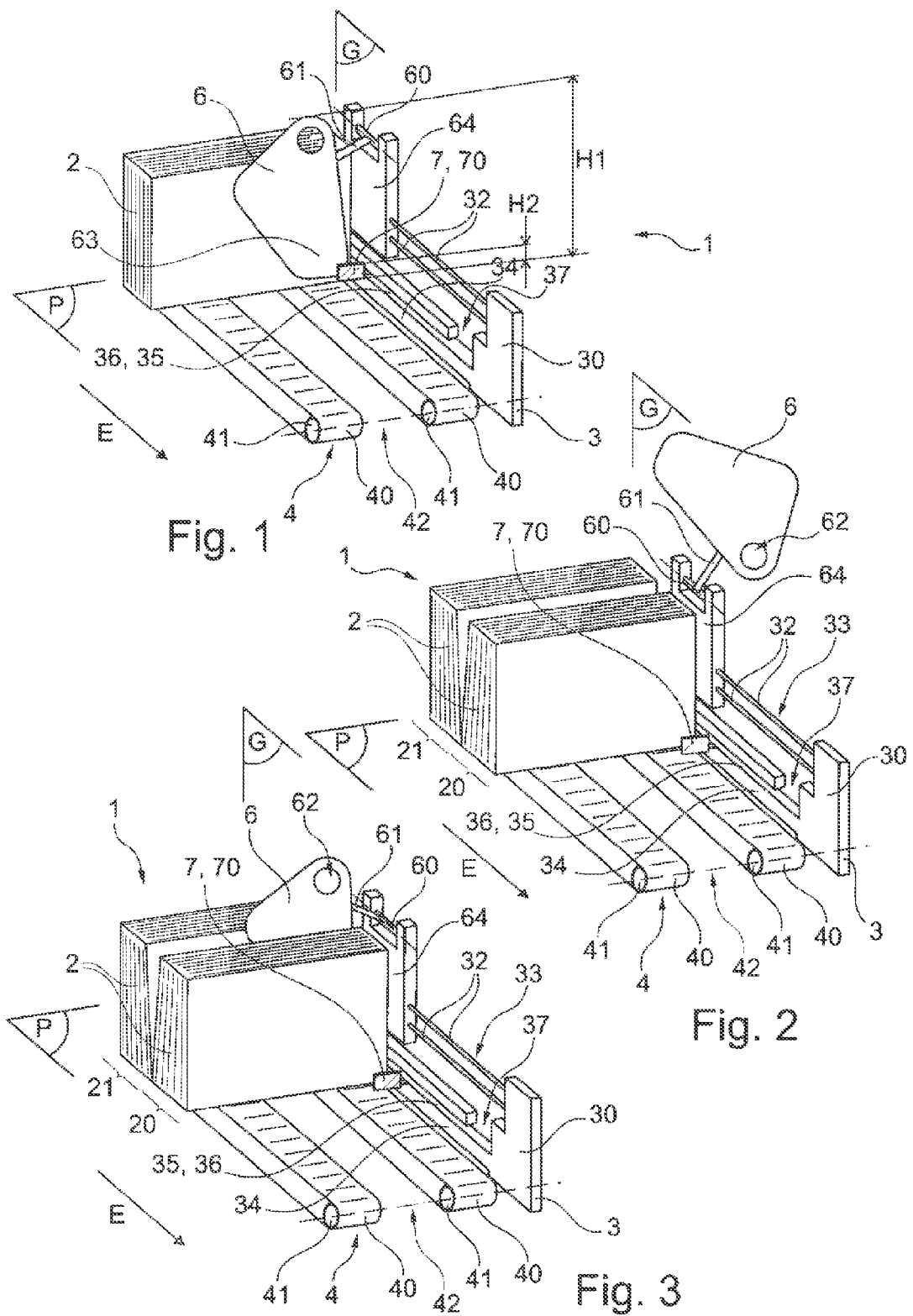

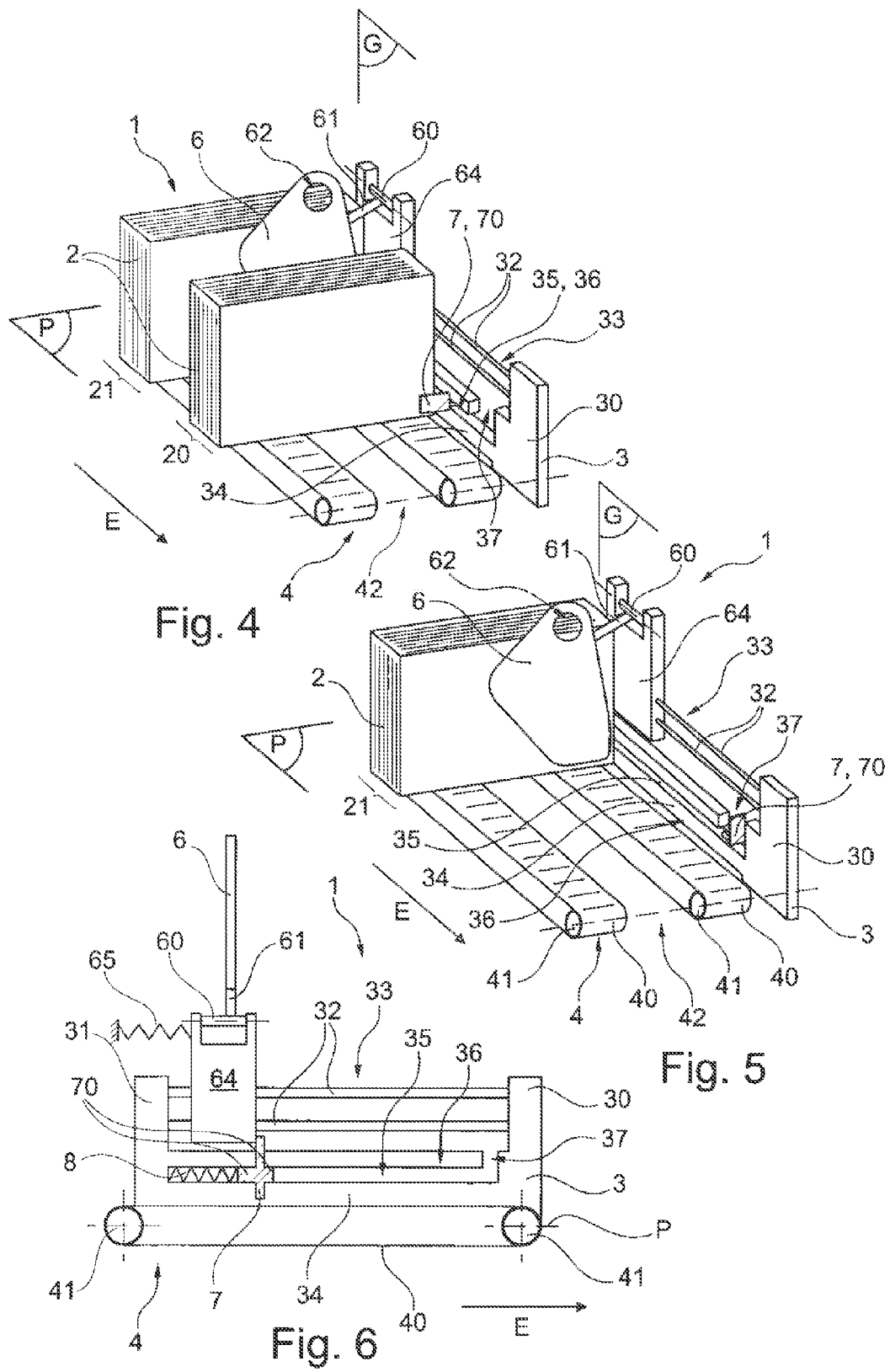

STACKER DEVICE FOR FLAT ARTICLES STACKED ON EDGE, AND A POSTAL SORTING MACHINE

CROSS REFERENCE TO RELATED APPLICATIONS

This application is a National Stage of International Application No. PCT/FR2012/052668 filed Nov. 19, 2012, claiming priority based on French Patent Application No. 11 61144 filed Dec. 5, 2011, the contents of all of which are incorporated herein by reference in their entirety.

TECHNICAL FIELD

The invention relates generally to a stacker device for flat articles stacked on edge, said device including at least one support defining a bearing plane suitable for receiving said stack of flat articles being formed along a predefined stacking path, a retaining paddle carried by a first slideway disposed laterally relative to the bearing plane and along which the retaining paddle is mounted to be moveable in translation along the stacking path between an upstream position and a downstream position, the retaining paddle also being retractable manually between a working position in which it extends above the bearing plane to a first working height and interferes with the stacking path so as to receive the surface of a flat article bearing against it and a resting position in which it does not interfere with the stacking path, the retaining paddle being coupled to braking means arranged to oppose movement of the retaining paddle during stacking.

The invention also relates to a postal sorting machine having sorting outlets provided with stacker devices and including such a stacker device.

In the meaning of the invention, a "flat article" means, particularly but not exclusively, a mailpiece. Mailpieces that are suitable for being stacked using the handling installation of the invention may be of various sizes, and they may also have a variety of mechanical characteristics, in particular as regards stiffness. Such a mailpiece may, inter alia, be an ordinary letter, a magazine, an envelope with or without a window, a newspaper, or indeed a catalog wrapped in plastic or in paper, with or without gussets.

PRIOR ART

That type of stacker device is in common use, in particular for stackers in mailpiece sorting machines. On exiting from such stackers, the mailpieces stack up to form a stack of mailpieces on edge retained by the retaining paddle associated with the braking means. Thus, the mailpieces stack up, tightly together and on edge. For example, the retaining paddle is carried by two rods extending along the path along which the stack is formed and constituting a first slideway. Once the stack has been formed, or while it is being formed, an operator takes mailpieces in successive handfuls and, for example, places them in a tray for transporting them. Often, the handful taken represents only a portion of the stack and is taken while the next mailpieces are continuing to be stacked. Therefore, in order to allow the stack to continue to be formed under good conditions, it is necessary for the handful of mailpieces to be taken while also holding the other mailpieces on edge and in a tight stack. For this purpose, when the retaining paddle is provided on the right of the stack being formed, the operator places the left hand above the front of the stack so that the thumb is against the front face of the first mailpiece of the stack and so that the other fingers are above the stack. With the other fingers, the operator defines the handful of mailpieces to be grasped by bringing the tops of the mailpieces in question towards the top of the first mailpiece in the stack. Once the handful of mailpieces has been defined by the fingers of the left hand, the operator moves the retaining paddle towards its resting position, and said paddle then no longer holds the front of the stack, this function being provided by the operator's hand and in particular by the operator's thumb. At this stage, the stability of the stack is weakened because its first mailpiece is held by the thumb only, which thumb bears only against the top of the first mailpiece. Thus, it is not infrequent, in particular with large-size and/or floppy mailpieces, for the bottom of the first mailpiece in the handful, or indeed for the bottoms of the next mailpieces, to slip and slide towards the front of the stack. The operator must then put the handful back into place before it can be placed in the transport tray. This additional handling operation is time-consuming and a source of risks of the mailpieces being improperly positioned relative to one another, or indeed of the mailpieces being damaged. That type of stacking device is therefore unsatisfactory.

Such a stacker device is, in particular, described by Publication U.S. Pat. No. 5,572,094, in which the retaining paddle is mounted to be movable along a horizontal slideway relative to which it is also free to pivot. The retaining paddle bears against the jogging strip via a rotary wheel bearing against an edge face of the jogging strip, which is inclined relative to the horizontal plane receiving the mailpieces on edge. Thus, as the stack of mailpieces is being formed, the inclination of the jogging strip causes the wheel to move gradually away from the horizontal plane and thus causes the retaining paddle to pivot. While the stack of mailpieces is being formed, the retaining paddle thus pivots gradually. Unfortunately, that stacker device does not make it possible to solve the above-raised problem.

In addition, Publication EP 1 306 337 describes a stacker device including a braking mechanism for braking the retaining paddle, which braking mechanism is suitable for opposing movement of the retaining paddle while the stack is forming. That braking mechanism is coupled to an adjustable resisting force mechanism suitable for varying the force from the braking mechanism that opposes movement of the retaining paddle. That stacker device does not make it possible to solve the above-raised problem either.

The stacker devices described by Publications JP 59 036 066, JP 59 150 300, EP 0 659 669, and U.S. Pat. No. 5,393, 196 do not make it possible to solve the problem either.

SUMMARY OF THE INVENTION

An object of the invention is to remedy those drawbacks by proposing a stacker device and a postal sorting machine enabling a handful of flat articles to be taken more easily and more reliably while also holding the remainder of the stack of flat articles effectively, in particular by preventing the bottom of the first article from slipping and sliding towards the front of the stack.

To this end, the invention provides a stacker device for flat articles stacked on edge, said device including at least one support defining a bearing plane suitable for receiving the stack of flat articles being formed along a predefined stacking path, a retaining paddle carried by a first slideway disposed laterally relative to the bearing plane and along which the retaining paddle is mounted to be moveable in translation along the stacking path between an upstream position and a downstream position, and to be retractable manually between a working position in which it extends above the bearing plane to a first working height and interferes with the stacking path so as to receive the surface of a flat article bearing against it and a resting position in which it does not interfere with the stacking path, the retaining paddle being coupled to braking means arranged to oppose movement of the retaining paddle during stacking, said stacker device being characterized in that it includes at least one holding finger suitable for being in a deployed position in which it extends above the bearing plane to a second working height less than the first working height and interferes with the stacking path so as to receive the foot of a flat article bearing against it, the holding finger being carried by a second slideway distinct from the first slideway, disposed laterally relative to the bearing plane on the same side as the first slideway and along which the bearing finger is mounted to be moveable in translation along the stacking path between a rear position and a front position, the holding finger being coupled to return means tending to oppose movement of the holding finger so as to prevent the foot of the flat article from slipping towards the front of the stack, the holding finger and the retaining paddle being arranged to be independent from each other so that the holding finger is suitable for retaining the foot of the flat article even when the retaining paddle is in its resting position.

The basic idea of the invention is to provide a holding finger on the same side of the support as the paddle, which holding finger is independent of the retaining paddle and has contact with the flat articles that is limited, by its working height being less than the working height of the paddle, at the foot of each first flat article. Thus, the holding finger retains the foot of the first flat article by preventing it from sliding forwards, even when the paddle is moved rearwards so as to make it possible to release a handful of flat articles to be grasped, while also leaving the tops of the flat articles accessible so as to allow them to be taken hold of.

The stacker device of the invention may advantageously have the following features:

the support is formed by two conveyor belts that are mutually parallel and that are spaced apart from each other so as to provide an access zone between them that is suitable for receiving the hand of an operator passing through from below the bearing plane to access said flat articles; a handful of flat articles can thus be grasped simultaneously from below and from above;

the stacker device includes at least one drive belt provided under the bearing plane between the conveyor belts and coupled to the conveyor belts so as to move therewith, the retaining paddle includes an extension arranged so that, when the retaining paddle is in the working position, the extension passes through the bearing plane and bears against the drive belt so that the retaining paddle is coupled to the drive belt so as to move therewith;

at least one of the elements comprising the holding finger and the retaining paddle has an abutment arranged to come to bear respectively against the retaining paddle or against the holding finger, and to prevent the holding finger from moving upstream from the retaining paddle along the stacking path;

the first slideway and the second slideway are provided in a guide plane that is perpendicular to the bearing plane;

the holding finger is arranged so that, when it is in a retraction position provided beyond the front position, it is also retractable from the deployed position to a retracted position in which it does not interfere with the stacking path;

the stacker device may include at least one jogging strip suitable for guiding the flat articles laterally along the stacking path, the jogging strip being provided with at least one groove defining the second slideway;

the groove is provided with at least one lateral notch suitable for receiving the holding finger in its retracted position and defining the retraction position, the holding finger being arranged to pivot relative to an axis that is substantially parallel to the stacking path to go between its deployed position and its retracted position; and the return means comprise at least one of the elements chosen from the group comprising at least one resilient return element and a counterweight.

The invention also provides a postal sorting machine having sorting outlets provided with at least one stacker device as described above.

BRIEF DESCRIPTION OF THE DRAWINGS

The present invention can be better understood and other advantages appear on reading the following detailed description of two embodiments given by way of non-limiting example and with reference to the accompanying drawings, in which:

FIGS. 1 to 5 are perspective views of a first embodiment of a stacker device of the invention, with the holding finger and the retaining paddle in different successive positions;

FIG. 6 is a side view of the stacker device of FIGS. 1 to 5 as empty (not containing any flat article);

DESCRIPTION OF THE EMBODIMENTS

Figure 7:
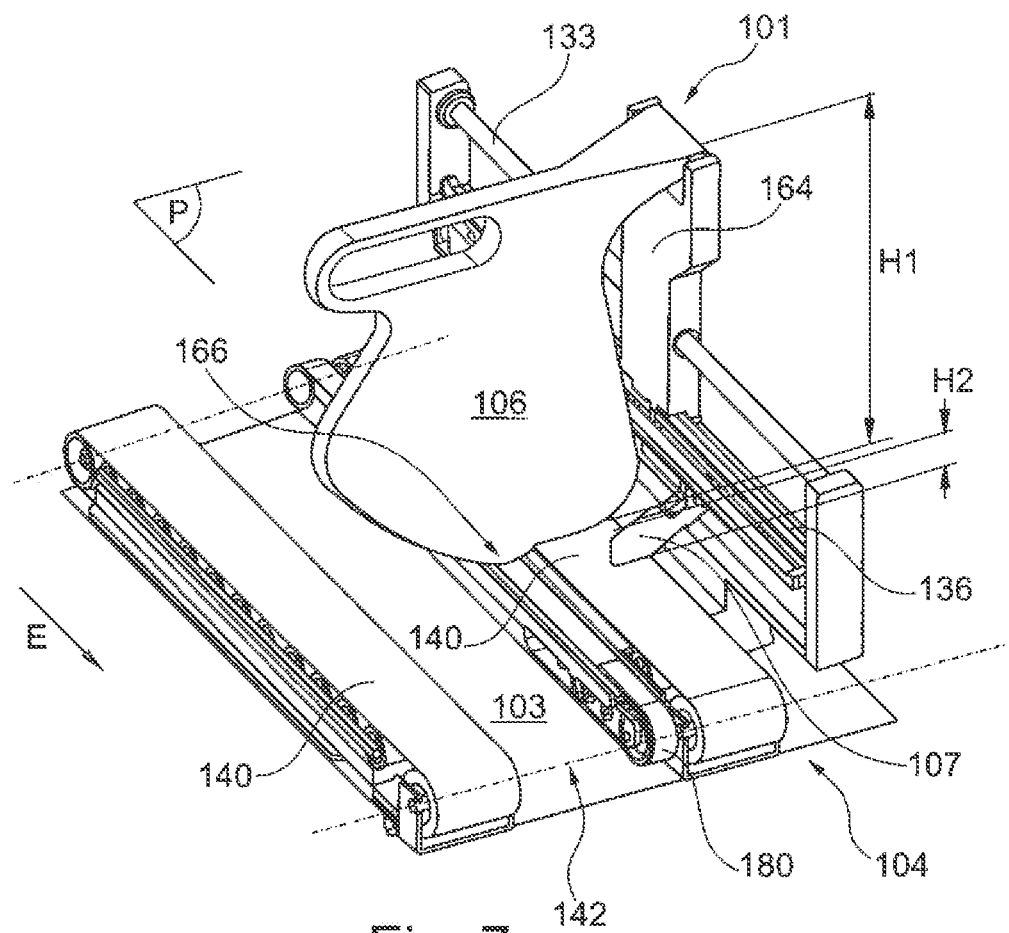
FIG. 7 is a perspective view of a second embodiment of a stacker device of the invention, as empty and with the retaining paddle and the holding finger being in intermediate positions; in this figure, the elements analogous to the elements shown in FIGS. 1 to 6 are given the same reference numerals, plus 100.

The stacker device of the invention for flat articles stacked on edge is, for example, placed at a sorting outlet of a postal sorting machine (not shown). However, this specific application is not limiting.

With reference to FIGS. 1 to 6, in a first embodiment of the invention, the stacker device 1 for flat articles 2 stacked on edge comprises a frame 3, a support 4 for flat articles 2, a jogging strip 34, a retaining paddle 6, and a holding finger 7.

In the example shown, the support 4 is made up of two conveyor belts 40 carried by pulleys 41 that are mounted to move in rotation relative to the frame 3, only a portion of which is shown. The conveyor belts 40 are disposed substantially mutually parallel so that the axes of their pulleys 41 substantially coincide and so that their top runs define co-planar bearing zones that are spaced apart and that define a bearing plane P suitable for receiving the stack of flat articles 2 on edge. The conveyor belts 40 define between them an access zone 42 suitable for receiving an operator's hand passing through from below for accessing the flat articles 2 resting on the bearing plane P. The pulleys 41 are either idler pulleys or motor-driven pulleys. The pulleys 41 and transporter belts 40 enable the stack of flat articles 2 to advance during the stacking, on the bearing plane P, along a predefined stacking path indicated in the figures by the arrow E. In order to limit slippage of the edges of the flat articles 2 on the conveyor belts 40, said conveyor belts may, for example, be made of a rough material. The support may be made up of any other suitable element.

The frame 3 includes a side wall offset to one side of the bearing plane P and having a cutout so as to form a downstream upright 30 and an upstream upright 31 between which two smooth rods 32 are fastened that are substantially parallel to each other and to the stacking path E. These rods 32 are superposed one above the other in a guide plane G that is substantially perpendicular to the bearing plane P. The rods 32 are situated above the bearing plane P, and thus on the same side as the side serving to receive the flat articles 2. These rods 32 define a first slideway 33 relative to which an arm 64 carrying the retaining paddle 6 is mounted to slide. The arm 64 is formed of a rectangular block shaped piece provided with two orifices suitable for slidably receiving the rods 32 that pass through them. The top portion of the arm 64 forms a clevis between the branches of which a pin embodying a pivot axis 60 of the retaining paddle 6 is received. The retaining paddle 6 is in the form of a plate provided with a lever 61 connected to the pin embodying the pivot axis 60. The plate extends in a plane substantially perpendicular to the stacking path E. In the example described, the retaining paddle 6 is trapezoid in shape. Naturally, this shape is not limiting. It may be provided with a through orifice 62 provided in the vicinity of the lever 61 and making it easier to manipulate. It is mounted to be movable in a plane perpendicular to the bearing plane P and to the guide plane G to go between a working position (shown in FIGS. 1, and 3 to 5) in which it is pivoted towards the bearing plane P, away from the guide plane G, and interferes with the stacking path E, and a resting position (shown in FIGS. 2 and 6) in which it is moved away from the bearing plane P towards the guide plane G and does not interfere with the stacking path E. Thus, in its working position, the retaining paddle 6 may be placed in front of the stack of flat articles 2 or in the stack of flat articles 2 so that the first flat article 2 in the stack bears against it and so that it retains on edge said first flat article 2 and the subsequent flat articles 2. In its working position, the retaining paddle 6 extends above the bearing plane P to a first working height H1 (shown in FIG. 1). Since the working height H1 of the retaining paddle 6 is greater than the height of the flat articles 2, the retaining paddle 6 extends above the height of the flat articles 2 when it is in its resting position. Thus, in its resting position, the retaining paddle 6 does not hinder movement of the flat articles 2. Via the first slideway 33, the retaining paddle 6 is also mounted to be movable along the stacking path E between an upstream position in which it can be placed in or behind the stack of flat articles 2, and a downstream position in which it is placed at the front of the stack of flat articles 2. The retaining paddle 6 is also coupled to braking means, e.g. a spring 65 as shown in FIG. 5, suitable for opposing movement of the retaining paddle 6, at least while it is moving from its upstream position to its downstream position. The retaining paddle 6 thus retains the flat articles 2 stacked behind it on edge.

The portion of the frame 3 that interconnects the downstream upright 30 and the upstream upright 31 forms a jogging strip 34 suitable for laterally guiding the flat articles 2 stacked on the conveyor belts 40. This jogging strip 34 is provided with a groove 35 extending substantially parallel to the stacking path E and defining a second slideway 36 relative to which the holding finger 7 slides. The second slideway 36 is thus parallel to the first slideway 33. The holding finger 7 is substantially T-shaped, the branches 70 of the T-shape (which branches are visible in FIG. 6) are received in the groove 35. Thus, the second slideway 36 is suitable for guiding the holding finger 7 along the stacking path E. The downstream end of the groove 35 is extended laterally by a side notch 37 allowing the holding finger 7 to pivot between its deployed position in which the stem 71 of the T-shape protrudes relative to the jogging strip 34 so as to interfere with the stacking path E and a retracted position in which the stem 71 of the T-shape is retracted into the side notch 37 and does not interfere with the stacking path E. The second slideway 36 is placed under the first slideway 33 in the guide plane G. Thus, in a direction perpendicular to the stacking path E, the holding finger 7 is provided between the conveyor belts 40 and the top of the retaining paddle 6 as in its working position. When it is in its deployed position, the holding finger 7 extends above said bearing plane P over a second working height H2 (shown in FIG. 1) that is less than the first working height H1. Thus, when the retaining paddle 6 is in its resting position, the holding finger 7 may receive the flat articles 2 placed behind it and bearing against it, this bearing being limited to the feet of the flat articles 2. When the retaining paddle 6 is in its working position, the holding finger 7 is pressed in front of the retaining paddle 6. The holding finger 7 is coupled to return means 8 (visible in FIG. 6) that tend to oppose movement of said holding finger. Thus, in its deployed position, the holding finger 7 makes it possible to prevent the foot of the first flat article 2 placed behind the holding finger 7 and the feet of the subsequent flat articles 2 from slipping forwards. In the example shown, these return means comprise a traction spring 8, one end of which is secured to the holding finger 7 while its other end is secured to the frame 3. The return means may be of any other type, e.g. a counterweight connected to the holding finger via a flexible link. Via the second slideway 36, the holding finger 7 is also mounted to be movable along the stacking path E between a rear position (shown in FIG. 1) in which it can be placed substantially in the same plane as the retaining paddle 6 as in its upstream position, and a front position (shown in FIGS. 2, 3, and 4) in which it is placed at the front of the stack of flat articles 2 and at the front of the retaining paddle 6. As can be seen in FIG. 6, in the example shown, the holding finger 7 has a height that, when it is in its deployed position, enables it to cross the path of the retaining paddle 6 when said retaining paddle is in its resting position. Conversely, when the retaining paddle 6 is in its working position, the path of the holding finger 7 as in its deployed position coincides with a portion of the path of the retaining paddle 6. Thus, when the holding finger 7 is in its deployed position and in its rear position respectively, it bears against the retaining paddle 6, which is then respectively in its upstream position and in its working position. By means of this particular construction, the holding finger 7 as in its deployed position remains continuously downstream from the retaining paddle 6 as in its working position, thereby removing the risk of stacking flat articles 2 between the retaining paddle 6 and the holding finger 7. In addition, by means of this particular construction, in the event of a jam, moving the retaining paddle 6 in its working position to its downstream position causes the holding finger 7 to move simultaneously to its front position without requiring any additional action by the operator. The holding finger 7 is mounted to be movable, beyond the front position, to the retraction position defined by the side notch 37 of the groove 35. In an embodiment (not shown), the holding finger 7 is provided with resilient pivot means tending to cause it to pivot into the side notch 37. Thus, as soon as the holding finger 7 is in register with the side notch 37, it goes from its deployed position to its retracted position by itself.

The holding finger 7 and the retaining paddle 6 are continuously above the bearing plane P and thus remain accessible to the operator, regardless of their positions. The difference between the working height H1 of the retaining paddle 6 and the working height H2 of the holding finger 7 makes it possible firstly for the retaining paddle 6 to be fully operational in its working position even in the absence of the holding finger 7 (when said holding finger is in its retracted position) so as to retain the flat articles 2 over their entire height, and secondly for the holding finger 7 to retain the feet of the flat articles 2 effectively while also leaving the tops of the flat articles 2 freely accessible, thereby making it easier for them to be taken hold of manually by the operator.

Figure 8:
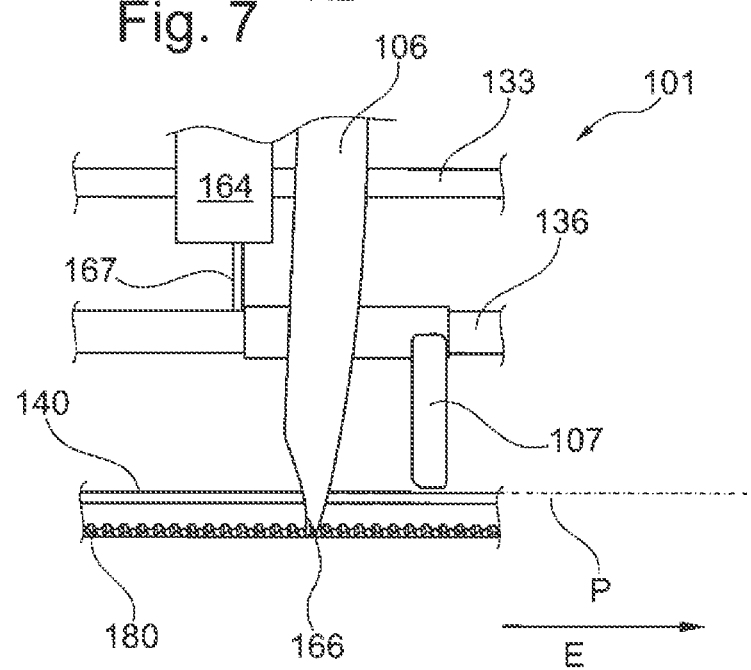
FIG. 8 is a perspective view of a detail of the stacker device of FIG. 7, showing, in particular, the abutment interfering between the retaining paddle and the holding finger.

The second embodiment of the stacking device 101 of the invention that is shown in FIGS. 7 and 8 is substantially similar to the preceding embodiment. The support 104, carried by the frame 103, is made up of two conveyor belts 140 separated by an access zone 142 that receives a drive belt 180. This drive belt 180 is of the toothed belt type and is disposed parallel to the conveyor belts 140, and offset under the bearing plane P. The drive belt 180 is movably coupled, by any known means, to the conveyor belts 140, so that they advance at the same time.

The retaining paddle 106 is guided by the first slideway 133 and the holding finger 107 is guided by the second slideway 136. The retaining paddle 106 includes an extension 166 that extends it. Thus, when the retaining paddle 106 is in its working position, the extension 166 passes through the bearing plane P and comes to be received between two teeth on the drive belt 180. The retaining paddle 106 and the drive belt 180 are thus constrained to move together.

The retaining paddle 106 is provided with an abutment 167 (shown in FIG. 8) extending under the arm 164 and interfering with the path of the holding finger 107 at the second slideway 136. Thus, the abutment 167 prevents the holding finger 107 from going upstream from the retaining paddle 106 relative to the stacking direction E. The holding finger 107 is blocked before its upstream surface comes into contact with the downstream surface of the retaining paddle 106. The abutment 167 is blocked regardless of the position of the holding finger 107 (retracted position, deployed position) and regardless of the position of the retaining paddle 106 (working position, resting position).

Use of the stacking device 1, 101 is described below, in non-limiting manner, with reference to the first embodiment of the stacking device 1. The second embodiment of the stacking device 101 is used in similar manner.

With reference to FIG. 6, in a first configuration prior to use, the retaining paddle 6 is in its resting position and in its upstream position respectively and the holding finger 7 is respectively in its deployed position and in its rear position. In order to use the stacker device 1, the retaining paddle 6 is pivoted from its resting position to its working position in which it interferes with the stacking path E along which the flat articles 2 are stacked. The holding finger 7 is then pressed in front of the retaining paddle 6. Stacking of the flat articles 2 is started behind the retaining paddle 6.

In a second configuration shown by FIG. 1, the retaining paddle 6 is respectively in its working position and in an intermediate position in which it has advanced relative to its upstream position, pushed by the faces of the flat articles 2 that are stacking up being it. The forward movement of the retaining paddle 6 is braked by the braking means (spring 65 in FIG. 6). In this second configuration, the holding finger 7 is respectively in its deployed position and in an intermediate position in which it has advanced relative to its rear position, pushed by the retaining paddle 6 in front of which it is pressed and by the feet of the flat articles 2 that are stacking up behind the retaining paddle 6. The forward movement of the holding finger 7 is braked by the return means 8. Thus, the retaining paddle 6 and the holding finger 7 advance gradually as the stack of flat articles 2 is being formed behind the retaining paddle 6. Regardless of the shape of the retaining paddle 6, by means of the holding finger 7, there is no risk of the foot of the first flat article 2 slipping and sliding towards the front of the stack. The stack is thus stable during the stacking.

In a third configuration (not shown), the stack has grown, the retaining paddle 6 and the holding finger 7 have progressed with the stacking and are respectively in their downstream position and their front position. It is time for the operator to grasp a handful 20 of flat articles 2 so as to transfer this handful 20, e.g. into a storage tray (not shown). For this purpose, the operator places the left hand above the front of the stack so that the thumb is against the front face of the first flat article 2 of the stack (and thus of the handful 20), and so that the other fingers are above the stack. With the ends of the other fingers, the operator defines the handful 20 of flat articles 2 to be grasped by bringing the tops of the flat articles 2 in question towards the top of the first flat article 2 in the stack.

In a fourth configuration shown by FIG. 2, once the handful of flat articles 2 have been defined by the fingers of the left hand of the operator, the retaining paddle 6 is retracted by the right hand, by pivoting about the pivot axis 60 from its working position to its resting position. In this fourth configuration, the retaining paddle 6 no longer interferes with the stacking path E and thus no longer holds the front of the stack of flat articles 2 which is retained by the hand of the operator and by the holding finger 7, which is still in its deployed position and which retains the foot of the first flat article 2 of the stack. The stack is thus stable and there is no risk of it slipping or sliding forwards while leaving the tops of the flat articles 2 accessible.

While holding the top of the stack, the operator then moves the retaining paddle 6 from its downstream position towards an intermediate position (between its upstream position and its downstream position) in which the retaining paddle 6 can be inserted between the handful 20 defined by the operator and the remainder of the stack 21.

The fifth configuration that is shown by FIG. 3 is thus obtained, in which configuration the retaining paddle 6 is respectively in an intermediate position and in its working position, and the holding finger 7 is respectively in its deployed position and in an intermediate position (between its rear position and its front position). Thus, the holding finger 7 still retains the foot of the first flat article 2 in the handful 20, advancing gradually so as to move with the stacking that can continue behind the retaining paddle 6, and the retaining paddle 6 retains the remainder of the stack 21.

As shown in FIG. 4, the operator who still has the left hand above the handful 20 of flat articles 2, inserts the right hand between the two conveyor belts 40, under the flat articles 2 of the handful 20 and then brings the handful 20 forwards. During this movement, the holding finger 7 is still ahead of the first flat 2 of the handle 20 and is moved towards its front position.

The operator removes the handful 20 of flat articles 2, leaving, in a fifth configuration shown in FIG. 5, the remainder of the stack 21 to form behind the retaining paddle 6. If the holding finger 7 does not need to be used for continuing the stacking, it can be retracted as shown. For this purpose, the operator can move the holding finger 7 to its retraction position provided beyond the front position, so that the holding finger 7 is in register with the side notch 37 and can be pivoted into it and into its retracted position, in which it is retracted into the jogging strip 34 so that it no longer interferes with the stacking path E. The holding finger 7 remains blocked in the side notch 37 by the return means 8 that press it against the wall of the side notch 37. The holding finger 7 can, at any time, be released and pivoted from its retracted position to its deployed position. Depending on how stacking is progressing or on whether flat articles 2 are present on the conveyor belts 40, it is then brought back by the return means 8 from its retraction position to its rear position or to any other intermediate position.

The operator may also choose to leave the holding finger 7 in its deployed position. The operator then removes the handful 20 of flat articles 2 without bringing the holding finger 7 to its retraction position.

Naturally, the way in which the left and right hands are used may be interchanged. Similarly, the retaining paddle 6, the holding finger 7, and the jogging strip 34 may be disposed symmetrically about the middle axis between the two conveyor belts 40.

It is clear from the description that the holding finger 7 and said retaining paddle 6 move independently from each other, thereby enabling the holding finger 7 to continue to retain the foot of the first flat article 2 in the handful 20 of flat articles 2 while the retaining paddle 6 is retracted so as to be moved from its downstream position rearwards to an intermediate position for retaining the remainder of the stack 21 if necessary.

Thus, by means of the holding finger 7, the foot of the front of the stack of flat articles 2 is continuously held effectively, there then being no risk of the foot of the first flat article 2 and the feet of the subsequent flat articles 2 sliding or slipping towards the front of the stack.

The invention claimed is:

1. A stacker device for flat articles stacked on edge, said stacker device comprising at least one support defining a bearing plane suitable for receiving said stack of flat articles being formed along a predefined stacking path, a retaining paddle carried by a first slideway disposed laterally relative to said bearing plane and along which said retaining paddle is mounted to be moveable in translation along said stacking path between an upstream position and a downstream position, and to be retractable manually between a working position in which it extends above said bearing plane to a first working height and interferes with said stacking path so as to receive the surface of a flat article bearing against it and a resting position in which it does not interfere with said stacking path, said retaining paddle being coupled to braking means arranged to oppose movement of said retaining paddle during stacking, said stacker device being characterized in that it includes at least one holding finger suitable for being in a deployed position in which it extends above said bearing plane to a second working height less than said first working height and interferes with said stacking path so as to receive the foot of a flat article bearing against it, said holding finger being carried by a second slideway distinct from said first slideway, disposed laterally relative to said bearing plane on the same side as said first slideway and along which said bearing finger is mounted to be moveable in translation along said stacking path between a rear position and a front position, said holding finger being coupled to return means tending to oppose movement of said holding finger so as to prevent the foot of said flat article from slipping towards the front of said stack, said holding finger and said retaining paddle being arranged to be independent from each other so that said holding finger is suitable for retaining said foot of the flat article even when said retaining paddle is in its resting position, said holding finger in a deployed position being further arranged to be displaced by said retaining paddle in a working position when the latter is moved to its downstream position so that said retaining paddle and said holding finger advance gradually and simultaneously as the stack of said stack of flat articles is being formed behind said retaining paddle.

2. A stacker device according to claim 1, characterized in that said support is formed by two conveyor belts that are mutually parallel and that are spaced apart from each other so as to provide an access zone between them that is suitable for receiving the hand of an operator passing through from below said bearing plane to access said flat articles.

3. A stacker device according to claim 2, characterized in that it includes at least one drive belt provided under said bearing plane between said conveyor belts and coupled to said conveyor belts so as to move therewith, in that said retaining paddle includes an extension arranged so that, when said retaining paddle is in said working position, said extension passes through said bearing plane and bears against said drive belt so that said retaining paddle is coupled to said drive belt so as to move therewith, and in that at least one of the elements comprising said holding finger and said retaining paddle has an abutment arranged to come to bear respectively against said retaining paddle or against said holding finger, and to prevent said holding finger from moving upstream from said retaining paddle along said stacking path, said holding finger being blocked until its upstream surface is in contact with the downstream surface of the retaining paddle.

4. A stacker device according to claim 1, characterized in that said holding finger in an extended position is arranged to be pressed in front of said retaining paddle in a working position and to be pushed by said retaining paddle and by the feet of the flat articles that are stacking up behind said retaining paddle.

5. A stacker device according to claim 1, characterized in that said first slideway and said second slideway are provided in a guide plane that is perpendicular to said bearing plane.

6. A stacker device according to claim 1, characterized in that said holding finger is arranged so that, when it is in a retraction position provided beyond said front position, it is also retractable from said deployed position to a retracted position in which it does not interfere with said stacking path.

7. A stacker device according to claim 6, characterized in that it includes at least one jogging strip suitable for guiding said flat articles laterally along said stacking path, said jogging strip being provided with at least one groove defining said second slideway, and further characterized in that said groove is provided with at least one lateral notch suitable for receiving said holding finger in its retracted position and defining said retraction position, said holding finger being arranged to pivot relative to an axis that is substantially parallel to said stacking path to go between its deployed position and its retracted position.

8. A stacker device according to claim 1, characterized in that it includes at least one jogging strip suitable for guiding said flat articles laterally along said stacking path, said jogging strip being provided with at least one groove defining said second slideway.

9. A stacker device according to claim 1, characterized in that said return means comprise at least one of the elements chosen from the group comprising at least one resilient return element and a counterweight.

10. A postal sorting machine having sorting outlets provided with stacker devices, said postal sorting machine being characterized in that it includes at least one stacker device according to claim 1.

* * * * *